US011991268B2

(12) United States Patent
Kenyan et al.

(10) Patent No.: US 11,991,268 B2
(45) Date of Patent: *May 21, 2024

(54) SHARING CRYPTOGRAPHIC SESSION KEYS AMONG A CLUSTER OF NETWORK SECURITY PLATFORMS MONITORING NETWORK TRAFFIC FLOWS

(71) Applicant: McAfee, LLC, San Jose, CA (US)

(72) Inventors: Manikandan A. Kenyan, Saratoga, CA (US); Anil Abraham, Bangalore (IN)

(73) Assignee: McAfee, LLC, San Jose, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/379,523

(22) Filed: Jul. 19, 2021

(65) Prior Publication Data

US 2021/0351918 A1   Nov. 11, 2021

Related U.S. Application Data

(62) Division of application No. 16/230,806, filed on Dec. 21, 2018, now Pat. No. 11,070,363.

(51) Int. Cl.
*H04L 9/08* (2006.01)
*H04L 9/32* (2006.01)
*H04L 9/40* (2022.01)
*H04L 29/06* (2006.01)

(52) U.S. Cl.
CPC .......... *H04L 9/0819* (2013.01); *H04L 9/0869* (2013.01); *H04L 9/3242* (2013.01); *H04L 63/0428* (2013.01)

(58) Field of Classification Search
CPC ... H04L 9/0819; H04L 9/0869; H04L 9/3242; H04L 63/0428
See application file for complete search history.

(56) References Cited

U.S. PATENT DOCUMENTS

| 6,212,633 | B1 | 4/2001 | Levy et al. |
| 6,980,521 | B1 | 12/2005 | Jarvis |
| 7,778,194 | B1* | 8/2010 | Yung ........................ H04L 43/00 709/224 |
| 8,966,267 | B1 | 2/2015 | Pahl et al. |
| 9,338,147 | B1 | 5/2016 | Rothstein et al. |
| 9,608,810 | B1* | 3/2017 | Ghetti .................... H04L 9/0822 |
| 9,705,769 | B1* | 7/2017 | Sarangapani ......... H04L 9/3242 |

(Continued)

OTHER PUBLICATIONS

International Searching Authority, "International Search Report," mailed in connection with International Patent Application No. PCT/US2019/066613, dated Mar. 17, 2020, 6 pages.

(Continued)

*Primary Examiner* — Phy Anh T Vu
(74) *Attorney, Agent, or Firm* — Hanley, Flight & Zimmerman, LLC

(57) ABSTRACT

A first example network security platform disclosed herein is to store a cryptographic session key from a server, the cryptographic session key associated with an encrypted network traffic flow between the server and a client different from the first network security platform. This disclosed first example network security platform is also to access a query from a second network security platform requesting the cryptographic session key, and generate a response including the cryptographic session key to send to the second network security platform.

14 Claims, 10 Drawing Sheets

(56) References Cited

U.S. PATENT DOCUMENTS

| | | | |
|---|---|---|---|
| 9,967,292 B1* | 5/2018 | Higgins | H04L 63/30 |
| 10,121,026 B1* | 11/2018 | Ryland | H05K 7/1414 |
| 11,070,363 B1 | 7/2021 | Kenyan et al. | |
| 2006/0280207 A1* | 12/2006 | Guarini | H04L 43/12 |
| | | | 370/524 |
| 2012/0134266 A1 | 5/2012 | Rothstein et al. | |
| 2012/0304244 A1 | 11/2012 | Xie et al. | |
| 2013/0262655 A1* | 10/2013 | Deschênes | H04L 43/12 |
| | | | 709/224 |
| 2014/0115702 A1 | 4/2014 | Li et al. | |
| 2015/0215236 A1 | 7/2015 | Joshi et al. | |
| 2015/0288514 A1 | 10/2015 | Pahl et al. | |
| 2015/0288679 A1 | 10/2015 | Ben-Nun et al. | |
| 2016/0013935 A1 | 1/2016 | Pahl et al. | |
| 2016/0112381 A1 | 4/2016 | Bhattacharyya et al. | |
| 2017/0039841 A1* | 2/2017 | Wilson | G08B 25/14 |
| 2017/0331822 A1* | 11/2017 | Mikulski | H04L 9/3242 |
| 2018/0278419 A1* | 9/2018 | Higgins | H04L 63/0428 |
| 2019/0068564 A1 | 2/2019 | Putatunda et al. | |
| 2019/0146849 A1 | 5/2019 | Leonard et al. | |
| 2019/0173671 A1 | 6/2019 | Yang et al. | |
| 2019/0199683 A1 | 6/2019 | Kenyan et al. | |
| 2019/0199684 A1 | 6/2019 | Kenyan et al. | |
| 2019/0387049 A1* | 12/2019 | Patil | H04L 67/1029 |
| 2020/0067700 A1* | 2/2020 | Bergeron | H04L 41/046 |
| 2020/0145391 A1* | 5/2020 | Sasidharan | H04L 9/0819 |
| 2020/0320199 A1* | 10/2020 | Sheth | H04L 63/0823 |

OTHER PUBLICATIONS

International Searching Authority, "Written Opinion," mailed in connection with International Patent Application No. PCT/US2019/066613, dated Mar. 17, 2020, 10 pages.

United States Patent and Trademark Office, "Notice of Allowance," mailed in connection with U.S. Appl. No. 16/230,806, dated Mar. 16, 2021, 18 pages.

International Searching Authority, "International Preliminary Report on Patentability," mailed in connection with International Patent Application No. PCT/US2019/066613 dated Jul. 1, 2021, 10 pages.

European Patent Office, "Communication pursuant to Article 94(3) EPC," issued in connection with European Patent Application No. 19 842 447.5-1218, dated Nov. 27, 2023, 4 pages.

* cited by examiner

SHARING CRYPTOGRAPHIC SESSION KEYS AMONG A CLUSTER OF NETWORK SECURITY PLATFORMS MONITORING NETWORK TRAFFIC FLOWS

This patent arises from a divisional of U.S. application Ser. No. 16/230,806 (now U.S. Pat. No. 11,070,363, which is titled "SHARING CRYPTOGRAPHIC SESSION KEYS AMONG A CLUSTER OF NETWORK SECURITY PLATFORMS MONITORING NETWORK TRAFFIC FLOWS," and which was filed on Dec. 21, 2018. Priority U.S. application Ser. No. 16/230,806 is claimed. U.S. application Ser. No. 16/230,806 is hereby incorporated herein by reference in its entirety.

FIELD OF THE DISCLOSURE

Field of the Disclosure

This disclosure relates generally to network protection and, more particularly, to sharing cryptographic session keys among a cluster of network security platforms monitoring network traffic flows.

Background

Network security platforms monitor network traffic in communication networks to identify potential malicious activity, unapproved activity, etc. Examples of network security platforms include, but are not limited to, intrusion prevention systems, intrusion detection systems, virus/malware scanning firewalls, etc. The traffic monitoring algorithms employed by such network security platforms are typically tailored to processing unencrypted network traffic. However, the presence of encrypted network traffic is becoming more commonplace in modern communication networks.

BRIEF DESCRIPTION OF THE DRAWINGS

The figures are not to scale. In general, the same reference numbers will be used throughout the drawing(s) and accompanying written description to refer to the same or like parts, elements, etc.

DETAILED DESCRIPTION

Figure 1:
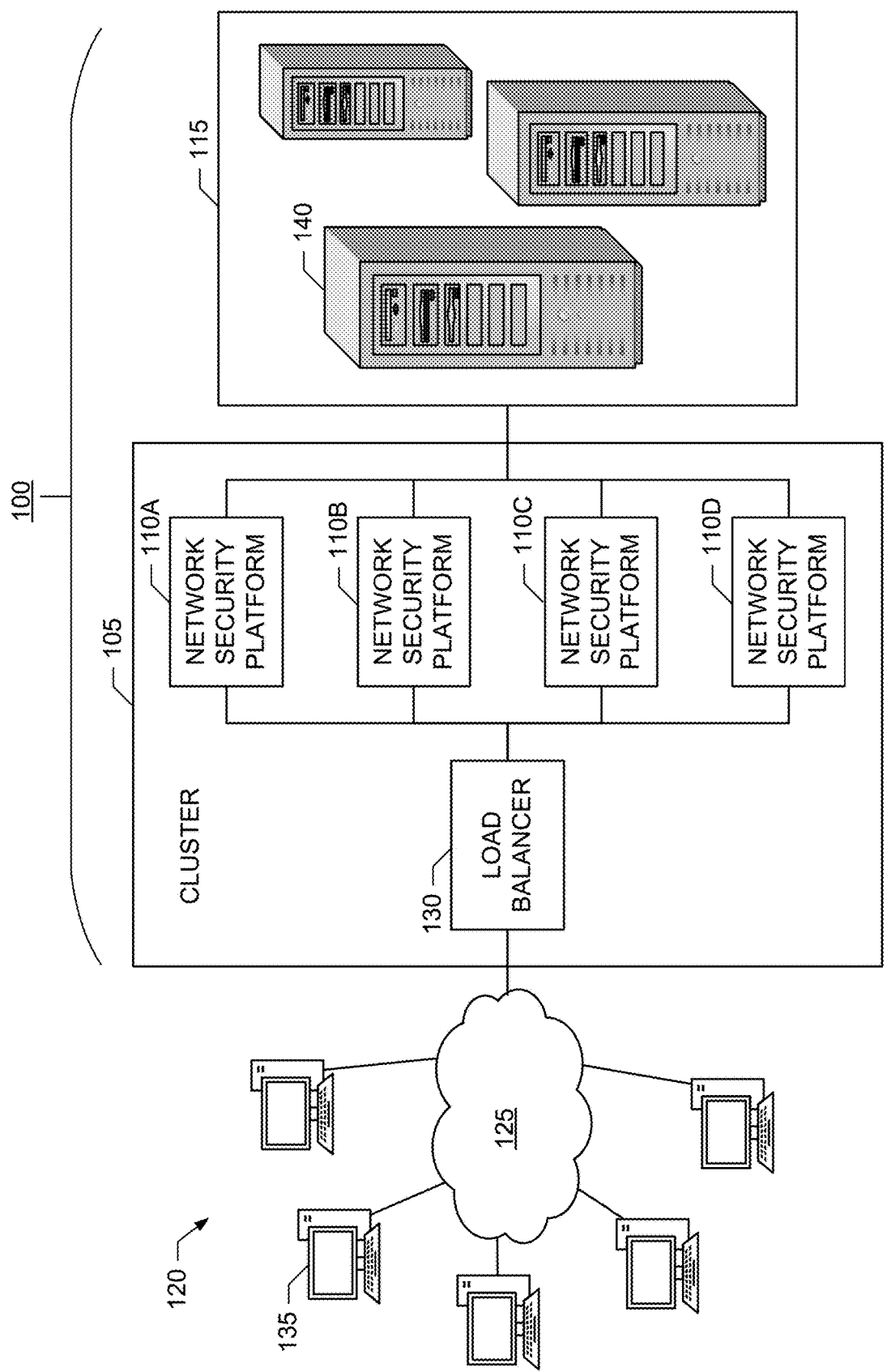
FIG. 1 is a block diagram of an example data center including an example cluster of network security platforms and example servers to collectively implement sharing of cryptographic session keys among the example cluster of network security platforms in accordance with teachings of this disclosure.

As mentioned above, network security platforms, such as intrusion prevention systems, intrusion detection systems, virus/malware scanning firewalls, etc., monitor network traffic in communication networks to identify potential malicious activity, unapproved activity, etc. Examples of malicious activity include, but are not limited to, ransomware attacks, data breaches, etc. Examples of unapproved activity include, but are not limited to, policy violations, snooping, etc. The traffic monitoring algorithms employed by network security platforms are typically tailored to processing unencrypted network traffic. However, the presence of encrypted network traffic is becoming more commonplace in modern communication networks. If network traffic encrypted, a network security platform may be unable to monitor the network traffic thoroughly unless the network security platform has the ability to decrypt the network traffic. As such, network security platforms are being designed with the capability to receive or otherwise determine the cryptographic session key(s) associated with the encrypted network traffic to be monitored, and to decrypt the encrypted network traffic using the associated cryptographic session key(s).

Prior techniques for obtaining cryptographic session keys at network security platforms include man-in-the-middle techniques and server sharing techniques. In a man-in-the-middle approach, the network security platform intercepts messages exchanged between a client and a server to establish an encrypted network traffic flow and replaces the cryptographic session key(s) generated by the client and the server for the network traffic flow with cryptographic session key(s) generated by the network security platform. In this way, the network security platform has access to the cryptographic session key(s) for the traffic flow and, thus, is able to decrypt the encrypted network traffic and monitor the resulting unencrypted traffic. In a first server sharing approach, the server shares its private key with the network security platform over a secure communication session, which enables the network security platform to decrypt handshake information exchanged between the client and the server when establishing the encrypted network traffic flow. The network security platform is then able to use this decrypted handshake information to generate the cryptographic session key(s) for the network traffic flow. In a second server sharing approach, the server shares the particular cryptographic session key(s) generated for the given network traffic flow with the network security platform over a secure communication session. The network security platform then has access to the particular cryptographic session key(s) for the given traffic flow and, thus, is able to decrypt the encrypted network traffic and monitor the resulting unencrypted traffic. However, none of these approaches for obtaining cryptographic session keys at network security platforms are readily scalable to support a cluster of network security platforms monitoring a communication network.

For example, consider a data center that employs a cluster of network security platforms to monitor network traffic between data center servers and external clients. The cluster of network security platforms may further include a load balancer to assign traffic flows to different network security platforms in the cluster for monitoring. For example, for a network flow being established between a client and a server of the data center, the load balancer may employ a load balancing algorithm to select one of the network security platforms of the cluster to monitor the network flow, with the network security platform selection based on network addresses of the client and/or server. As such, traffic flows between different clients and servers may be monitored by different ones of the network security platforms in the cluster. Thus, to implement the first server sharing approach described above with such a cluster of network security platforms, each server would need to share its private key with every network security platforms in the cluster, which can be burdensome to manage, especially if the servers change their respective private keys according to different schedules. To implement a man-in-the-middle approach for obtaining cryptographic keys in such a cluster of network security platforms, every network security platforms in the cluster would need to implement man-in-the-middle processing because any of the network security platforms could be called upon to process any network traffic flow, which increases computational complexity of the network security platforms and, thus, the cost of the cluster as a whole. Furthermore, because the servers may not know which network security platform of the cluster is assigned to monitor the network traffic flow with a particular client, to implement the second server sharing approach described above with such a cluster of network security platforms, a server would need to share the cryptographic key(s) associated with a network flow with all network security platforms although only one of the network security platforms would actually need the cryptographic key(s) to monitor the network traffic flow. The other network security platforms in the cluster would have no use for the cryptographic key(s) and, thus, the unneeded cryptographic key(s) could be discarded. Accordingly, such a prior server sharing approach described for sharing cryptographic keys does not scale for clusters of network security platforms as the prior approach incurs excessive bandwidth and computational resources to share unneeded cryptographic key(s) with network security platforms in the cluster.

Example methods, apparatus, systems and articles of manufacture (e.g., physical storage media) disclosed herein implement sharing of cryptographic session keys among a cluster of network security platforms in a manner that solves the foregoing technical problems associated with prior techniques for obtaining cryptographic session keys at the network security platforms in the cluster. For example, cluster-based cryptographic key sharing, as disclosed herein, avoids the use of man-in-the-middle approaches, thereby reducing the complexity of the network security platforms in the cluster. Furthermore, cluster-based cryptographic key sharing as disclosed herein substantially reduces the bandwidth and computational resources associated with prior server-based key sharing approaches by employing a novel platform selection procedure that enables a server to limit sharing of the cryptographic session key(s) for a given flow with just one network security platform in the cluster, rather than all network security platforms in the cluster. As disclosed in further detail below, the novel platform selection procedure also enables a target network security platform in the cluster, which is assigned by the load balancer to monitor the given network traffic flow, to identify the network security platform to which the server shared the cryptographic session key(s), and to obtain the cryptographic session key(s) from that network security platform. In this way, cluster-based cryptographic key sharing, as disclosed herein, can scale to network security platform clusters of any size, with a server still being able to limit sharing of the cryptographic session key(s) for a given network traffic flow with just one of the network security platforms in the cluster, and a target network security platform assigned to monitor the given network traffic flow being able to know with certainty the network security platform of the cluster from which the associated cryptographic session key(s) can be retrieved. These and other aspects of cluster-based cryptographic key sharing are disclosed in further detail below.

Turning to the figures, a block diagram of an example data center 100 including an example cluster 105 of network security platforms 110A-D and example servers 115 to collectively implement sharing of cryptographic session keys among the example cluster 105 of network security platforms 110A-D in accordance with teachings of this disclosure is illustrated in FIG. 1. In the example of FIG. 1, the network security platforms 110A-D include, for example, any type(s) and/or number(s) of intrusion prevention systems (IPSs), intrusion detection systems (IDSs), virus/malware scanning firewalls, etc., and/or any other type of network sensor, or combination thereof, to monitor network traffic between the servers 115 and example clients 120. The servers 115 include, for example, any type(s) and/or number(s) web servers, database servers, cloud servers, etc., and/or any type of server or computing device accessible by one or more of the client 120. The clients 120 include, for example, any type(s) and/or number(s) computing devices, smart appliances, media devices, etc., such as, but not limited to, personal computers, notebook computers, smartphones, tablet computers, Internet of Things (IoT) devices, etc., or any combination thereof.

In the illustrated example of FIG. 1, the clients 120 communicate with the data center 100 via an example network 125. The network 125 can correspond to any type(s) and/or number(s) of networks, such as, but not limited to, a public network (such as the Internet), a private network, etc., or any combination thereof.

In the illustrated example of FIG. 1, the cluster 105 of network security platforms 110A-D also includes an example load balancer 130. The load balancer 130 of the illustrated example is to assign network security platforms 110A-D to monitor network traffic flows between the clients 120 and the servers 115. For example, the load balancer 130 may assign the network security platform 110A to monitor a network traffic flow initiated between an example client 135 included in the clients 120 and an example server 140 included in the servers 115 of the data center 100. As such, different ones of the network security platforms 110A-D may be assigned to monitor different network traffic flows between different ones of the clients 120 and different ones of the servers 115. The load balancer 130 may employ any load balancing algorithm or combination of algorithms to assign network security platforms 110A-D to monitor network traffic flows between the clients 120 and the servers 115. For example, the load balancer 130 may employ a load balancing algorithm that assigns one of the network security platforms 110A-D of the cluster 105 to monitor a network traffic flow based on a 5-tuple, such as (source network address, source port number, destination network address, destination port number, protocol type), describing the flow.

In the illustrated example of FIG. 1, the network security platforms 110A-D of the cluster 105 and the servers 115 collectively implement cluster-based cryptographic key sharing, as disclosed herein, to permit monitoring of encrypted network traffic flows between the clients 135 and the servers 115. For example, consider the scenario in which the cluster 105 is to monitor a transport layer security (TLS) flow, which is an encrypted network flow, between the client 135 and the server 140. The TLS flow may be in support of a hypertext transport protocol (HTTP) session between the client 135 and the server 140. As described above, the load balancer 130 may assign any one of the network security platforms 110A-D of the cluster 105 to monitor the TLS flow between the client 135 and the server 140. For example, the load balancer 130 may assign the network security platform 110A to monitor the TLS flow between the client 135 and the server 140.

As described above, the assigned network security platform 110A-D, which is the network security platform 110A in this example, requires access to the cryptographic session key(s) associated with the TLS flow to enable decryption and monitoring of the encrypted network traffic corresponding to the TLS flow. However, the server 140 will not know which network security platform 110A-D of the cluster 105 is assigned to monitor the TLS flow between the client 135 and the server 140. Thus, the server 140 also will not know to which one of the network security platforms 110A-D, which is the network security platform 110A in this example, the cryptographic session key(s) associated with the TLS flow between the client 135 and the server 140 should be shared. Cluster-based cryptographic key sharing, as disclosed herein, is implemented by the server 140 and the network security platforms 110A-D of the cluster 105 to solve this problem.

At a high-level, when implemented by the server 140 in accordance with teachings of this disclosure, cluster-based cryptographic key sharing, in this example, involves the server 140 performing a novel platform selection procedure to select which one of the network security platforms 110A-D of the cluster 105 the server 140 is to share the cryptographic session key(s) associated with the TLS flow between the client 135 and the server 140 (which may or may not be the network security platform actually assigned by the load balancer 130 to monitor the TLS flow). In some examples, the platform selection procedure uses data values included in unencrypted messages exchanged between client 135 and the server 140 during establishment of the TLS flow to generate a platform selection value indexing one of the network security platforms 110A-D of the cluster 105. For example, the platform selection value generated by the platform selection procedure may correspond to the network security platform 110C of the cluster 105. In such an example, the server 140 then shares the cryptographic session key(s) associated with the TLS flow between the client 135 and the server 140 with the selected network security platform 110C.

Similarly, when implemented by the network security platform 110A, in accordance with teachings of this disclosure, cluster-based cryptographic key sharing, in this example, involves the network security platform 110A, which was assigned by the load balancer 130 to monitor the TLS flow between the client 135 and the server 140, also performing the novel platform selection procedure to select which one of the network security platforms 110A-D of the cluster 105 is to receive, from the server 140, the cryptographic session key(s) associated with the TLS flow between the client 135 and the server 140. As described above, the platform selection procedure uses data values included in unencrypted messages exchanged between client 135 and the server 140 during establishment of the TLS flow to generate a platform selection value indexing one of the network security platforms 110A-D of the cluster 105, which is the network security platform 110C in this example. In such an example, the network security platform 110A then queries the selected network security platform 110C for the cryptographic session key(s) associated with the TLS flow between the client 135 and the server 140. The network security platform 110A then uses the cryptographic session key(s) received from the network security platform 110C to decrypt and monitor the network traffic corresponding to the TLS flow between the client 135 and the server 140.

In examples disclosed herein, monitoring of encrypted network traffic is described in the context of monitoring TLS flows. However, cluster-based cryptographic key sharing, as disclosed herein, is not limited thereto. For example, the network security platforms 110A-D and the servers 115 of the data center 100 can employ cluster-based cryptographic key sharing, as disclosed herein, to monitor secure socket layer (SSL) flows between the clients 135 and the servers 115, and/or any other encrypted network traffic flows between the clients 135 and the servers 115. Thus, TLS and SSL are used interchangeably in this disclosure unless indicated otherwise.

Figure 2:
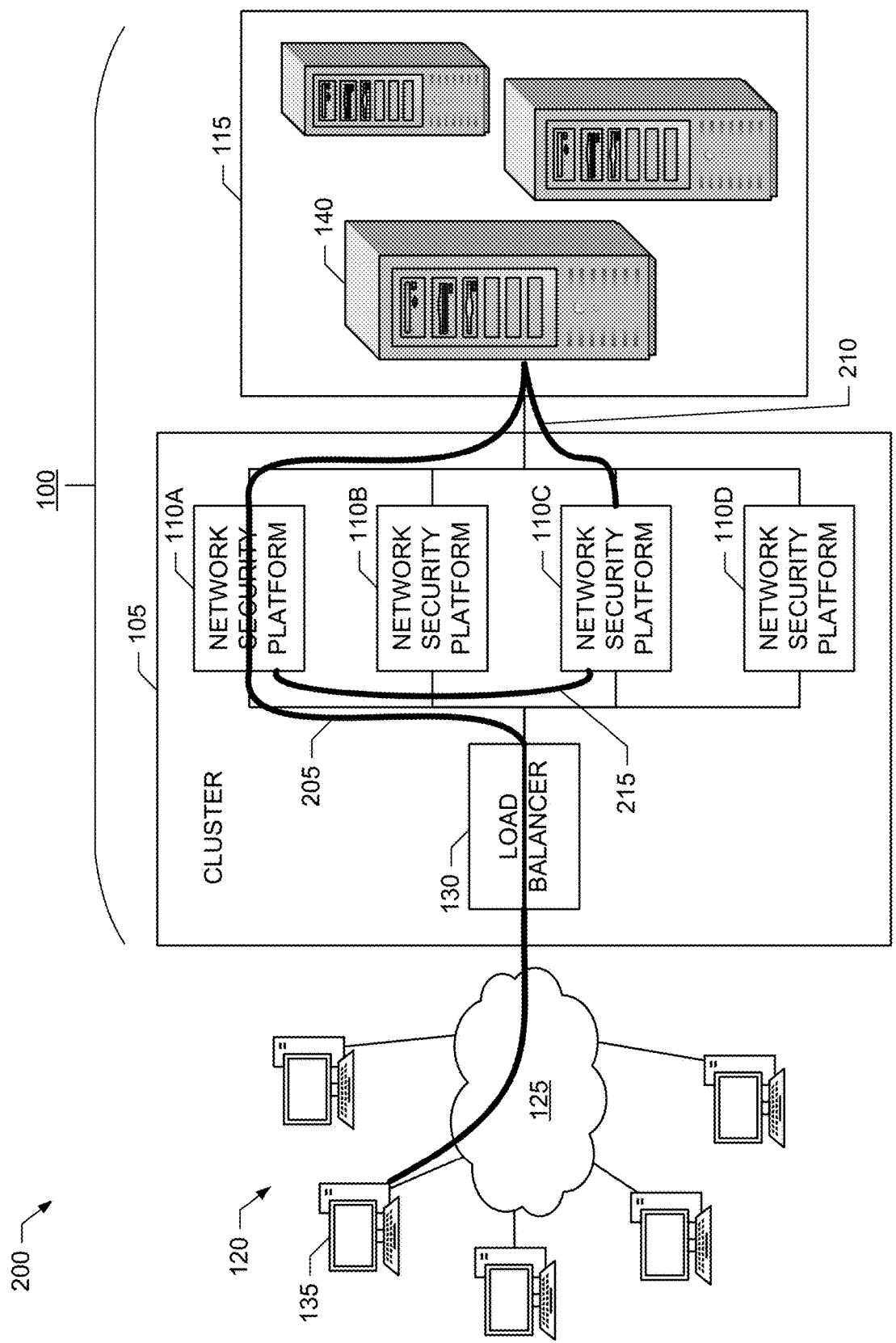
FIG. 2 is a block diagram of an example operation of the example cluster of network security platforms and an example server of FIG. 1 to share cryptographic session keys among the example cluster of network security platforms in accordance with teachings of this disclosure.

An example operation 200 of the example cluster 105 of network security platforms 110A-D and the example server 140 of FIG. 1 to share cryptographic session keys in accordance with teachings of this disclosure to support monitoring of an example TLS flow 205 between the example client 135 and the example server 140 is illustrated in FIG. 2. In the illustrated example of FIG. 2, the servers 115 and the network security platforms 110A-D of the cluster 105 maintain configuration information in a list, or any other data structure, identifying the network security platforms 110A-D included in the cluster 105. The configuration information may be obtained from a configuration file, a management system managing the cluster 105, etc. The configuration information includes network information enabling the servers 115 to identify and communicate with the network security platforms 110A-D, and to enable the network security platforms 110A-D to identify and communicate amongst each other. The configuration information also includes respective platform selection values uniquely identifying respective ones of the network security platforms 110A-D. For example, the platform selection values may be integers from 1 to N, where N is the number of network security platforms 110A-D of the cluster 105, and each network security platforms 110A-D may be assigned a unique integer value from 1 to N.

The example operation 200 of FIG. 2 begins with the server 140 accessing two parameter values from two messages exchanged between the client 135 and the server 140 to establish the new TLS flow 205. For example, the server 140 may access the Client Random value included in the header of a Client Hello message sent from the client 135 to the server 140, and may access the Server Random value included in the header of a Server Hello message sent from the server 140 to the client 135 according to the TLS protocol. The Client Random value and the Server Random value are each 32 bytes in length and are considered to be cryptographically strong random numbers. The Client Random value and the Server Random value uniquely identify the TLS flow 205.

Next, the server 140 uses the two parameter values (e.g., the Client Random value and the Server Random value) as input to a platform selection procedure to determine a platform selection value identifying which one of the network security platforms 110A-D the server 140 is to share the cryptographic session key(s) associated with the TLS flow 205. In some examples, the platform selection procedure implemented by the server 140 is to compute a hash of the two parameter values to determine a hash value, and then process the hash value with a modulo operation based on a number of network security platforms 110A-D (e.g., N) included in the cluster 105 to determine the platform selection value. For example, the platform selection value may be computed according to the mathematical expression of Equation 1:

$$PSV = \text{modulo}_N(\text{hash}(p1, p2)) \quad \text{Equation 1}$$

In Equation 1, PSV represents the platform selection value, p1 and p2 are the two parameter values (e.g., the Client Random value and the Server Random value), hash( ) represents the hash operation, $\text{modulo}_N$( ) represents the modulo-base-N operation, and N represents the number of network security platforms 110A-D included in the cluster 105. The resulting platform selection value (PSV) is an integer uniquely identifying, according to the configuration information described above, which one of the network security platforms 110A-D the server 140 is to share the cryptographic session key(s) associated with the TLS flow 205.

In the illustrated example operation 200 of FIG. 2, the platform selection value computed by the server 140 corresponds to the network security platform 110C. Accordingly, the server 140 share the cryptographic session key(s) associated with the TLS flow 205 with network security platform 110C (represented by line 210 in FIG. 2).

In the example operation 200 of FIG. 2, the load balancer 130 has assigned the network security platform 110A to monitor the network traffic corresponding to the TLS flow 205, as shown. Thus, in parallel with the operations performed by the server 140, the network security platform 110A also accesses the same two parameter values (e.g., the Client Random value and the Server Random value) from the same two messages (e.g., the Client Hello message and the Server Hello message) exchanged between the client 135 and the server 140 to establish the new TLS flow 205. The network security platform 110A also performs the same platform selection procedure as the server 140 (e.g., corresponding to Equation 1) to compute the platform selection value identifying, according to the configuration information described above, which one of the network security platforms 110A-D the server 140 is to share the cryptographic session key(s) associated with the TLS flow 205.

In the illustrated example operation 200 of FIG. 2, the platform selection value computed by network security platform 110A corresponds to the network security platform 110C. Accordingly, the network security platform 110A queries the network security platform 110C for the cryptographic session key(s) associated with the TLS flow 205 (represented by line 210 in FIG. 2). After receiving the cryptographic session key(s) from the network security platform 110C, the network security platform 110A is able to decrypt and monitor the network traffic corresponding to the TLS flow 205.

Figure 3:
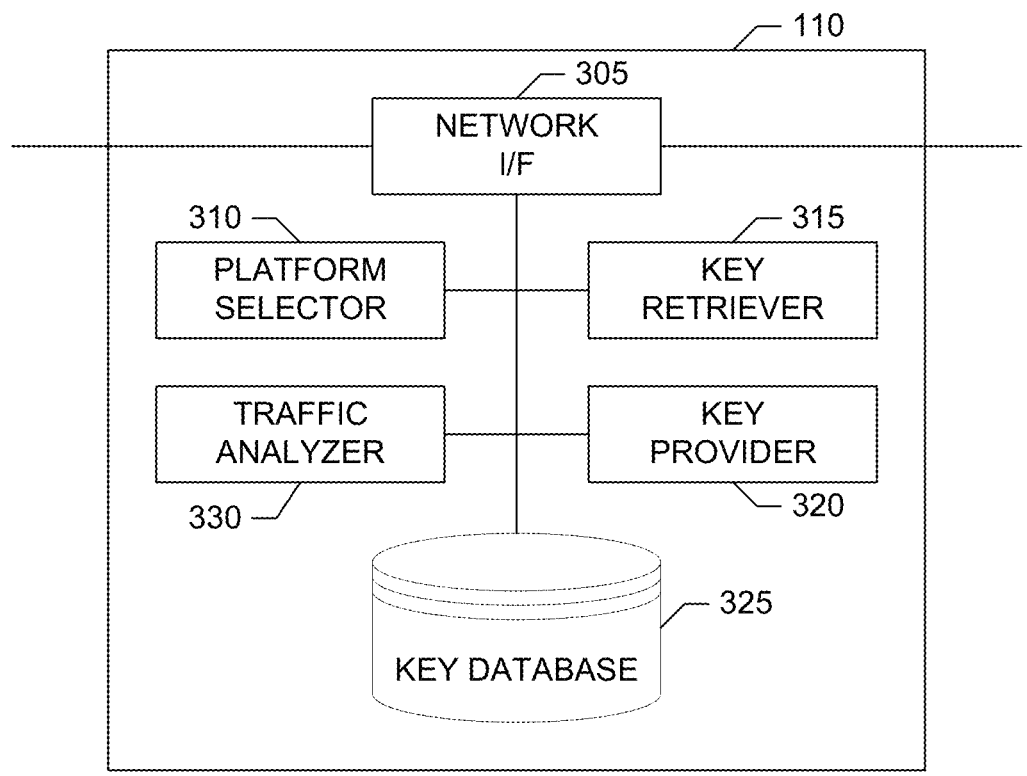
FIG. 3 is a block diagram of an example implementation of an example network security platform included in the example cluster of network security platforms of FIGS. 1 and/or 2.

A block diagram of an example network security platform 110, which may be used to implement any of the network security platforms 110A-D of FIGS. 1-2 is illustrated in FIG. 3. The example implementation illustrated in FIG. 3 focuses on aspects of the network security platform 110 related to cluster-based cryptographic key sharing, as disclosed herein. Implementation details related to other aspects of the network security platform 110 are omitted for clarity.

The example network security platform 110 of FIG. 3 includes an example network interface 305, an example platform selector 310, an example key retriever 315, an example key provider 320, an example key database 325 and an example traffic analyzer 330. The network interface 305 provides the network security platform 110 with access to the network 125 and the servers 115 of the data center 100.

The platform selector 310 of the illustrated example is to determine a platform selection value based on a first parameter value (e.g., the Client Random value) in a first message (e.g., the Client Hello message) from a client (e.g., the client 135) and a second parameter value (e.g., the Server Random value) in a second message (e.g., the Server Hello message) from a server (e.g., the server 140). For example, the first and second messages may be associated with establishment of an encrypted network traffic flow (e.g., the flow 205) between the client and the server that is to be monitored by the network security platform 110. In some examples, the platform selector hashes the first parameter value (e.g., the Client Random value) and the second parameter value (e.g., the Server Random value) to determine a hash value (such as a hash performed the concatenation of the first parameter value and the second parameter value), and then processes the hash value with a modulo operation based on a number of network security platforms 110A-D included in the cluster 105 to determine the platform selection value (see Equation 1 above).

The key retriever 315 of the illustrated example is to obtain one or more cryptographic session keys associated with the encrypted network traffic flow (e.g., the flow 205) from a selected one of a cluster of network security platforms 110A-D (e.g., the network security platform 110C) based on the platform selection value. For example, the key retriever 315 determines whether the platform selection value identifies the network security platform 110 itself as the selected one of the cluster 105 of network security platforms 110A-D. If so, the server (e.g., server 140) will share the cryptographic session key(s) directly with the network security platform 110 itself. Thus, the cryptographic session key(s) will be stored locally in the key database 325 and the key retriever 315 can retrieve the cryptographic session key(s) from the key database 325.

However, when the network security platform 110 is not the identified by the platform selection value as the selected one of the cluster of network security platforms 110A-D, the key retriever 315 sends a query to the selected one of the cluster of network security platforms 110A-D (e.g., the network security platform 110C) identified by the platform selection value. For example, the query may include the first parameter value (e.g., the Client Random value) accessed from the first message (e.g., the Client Hello message) from the client (e.g., the client 135) and the second parameter value (e.g., the Server Random value) accessed from the second message (e.g., the Server Hello message) from the (e.g., the server 140). The key retriever 315 then accesses a response from the selected one of the cluster of network security platforms 110A-D (e.g., the network security platform 110C), with the response including the cryptographic session key(s) for the network flow (e.g., the flow 205) to be monitored.

The traffic analyzer 330 of the illustrated example is to analyze the network traffic associated with the encrypted network traffic flow (e.g., the flow 205) based on the cryptographic session key(s) obtained from the selected one of a cluster of network security platforms 110A-D (e.g., the network security platform 110C). In some examples, the traffic analyzer 330 is to buffer one or more other messages exchanged between the client (e.g., client 135) and the server (e.g., the server 140) to establish the encrypted network traffic flow (e.g., the flow 205) until the cryptographic session key(s) for the network flow (e.g., the flow 205) is(are) retrieved and, in some examples, until the message(s) are verified. In some such examples, the traffic analyzer 330 passes the buffered message(s) to the intended recipient (e.g., the client 135 or server 140) once the cryptographic session key(s) have been received and/or the message(s) are verified, and generates an error message if a timeout period elapses without the key retriever 315 being able to retrieve the cryptographic session key(s) from the selected one of the cluster of network security platforms 110A-D (e.g., the network security platform 110C), or if the message verification is unsuccessful.

The key database 325 of the illustrated example is to store cryptographic session keys received from the servers 115 (e.g., such as the server 140) and/or from other network security platforms. The cryptographic session keys are associated with encrypted network traffic flows between the servers 115 (e.g., the server 140) and the clients 120 (e.g., the client 135). In some examples, the cryptographic session key(s) for a given flow (e.g., the flow 205) are received in a message from the server (e.g., the server 140). In some such examples, the message also includes the first parameter value and the second parameter value described above to identify the cryptographic session key(s) as being associated with the given flow (e.g., the flow 205).

The key provider 320 of the illustrated example is to access a query from another network security platform (e.g., the network security platform 110A) requesting the cryptographic session key(s) associated with an encrypted traffic flow (e.g., the flow 205). In some such examples, the query includes the first parameter value and the second parameter value described above to identify the given flow (e.g., the flow 205) for which the cryptographic session key(s) are being requested. The key provider 320 then generates a response including the cryptographic session key(s) to send to requesting network security platform (e.g., the network security platform 110A). In some examples, the key provider 3200 buffers the query from the other network security platform (e.g.,) until receipt of the cryptographic session key(s) from the server (e.g., the server 140), and then sends the response after receipt of the cryptographic session key(s) from the server (e.g., the server 140).

Figure 5:
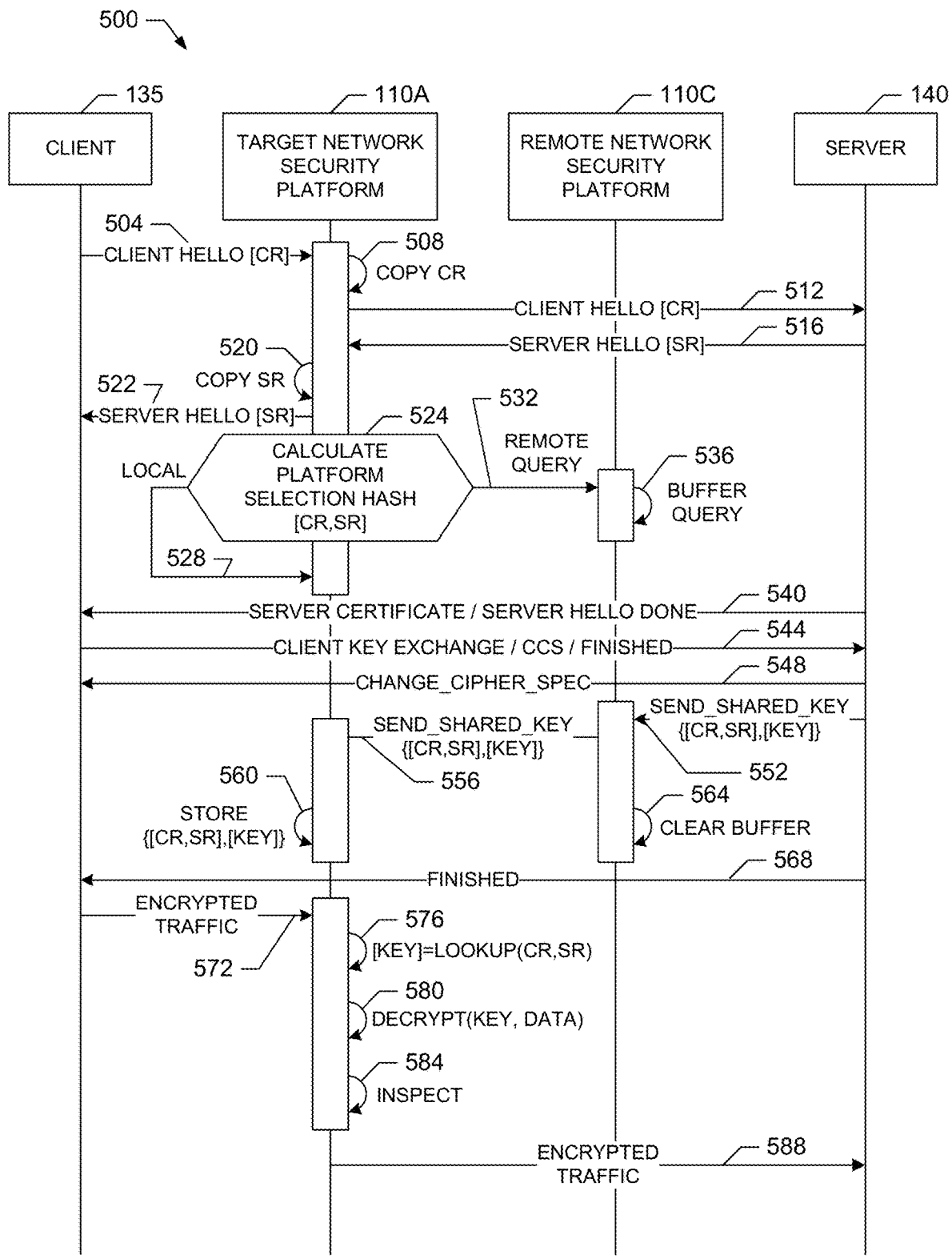
FIG. 5 is an example message sequence diagram illustrating example operation of the example cluster of network security platforms and the example server of FIG. 1 to share cryptographic session keys among the example cluster of network security platforms in accordance with teachings of this disclosure.

Further operation details of the example platform selector 310, the example key retriever 315, the example key provider 320, the example key database 325 and the example traffic analyzer 330 included in the example network security platform 110 of the FIG. 3 are described in the context of the example message sequence diagram 500 of FIG. 5.

Figure 4:
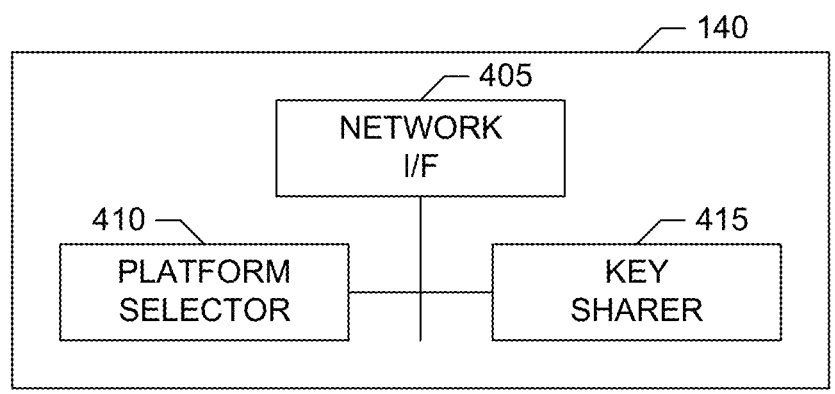
FIG. 4 is a block diagram of an example implementation of the example server of FIGS. 1 and/or 2.

A block diagram illustrating an example implementation of the server 140 of FIGS. 1-2 is illustrated in FIG. 4. However, the example implementation illustrated in FIG. 4 could be used to implement any of the servers 115 of FIGS. 1-2. Also, the example implementation illustrated in FIG. 4 focuses on aspects of the server 140 related to cluster-based cryptographic key sharing, as disclosed herein. Implementation details related to other aspects of the server 140 are omitted for clarity.

The example server 140 of FIG. 4 includes an example network interface 405, an example platform selector 410 and an example key sharer 415. The network interface 405 provides the server 140 with access to the network 125 and the cluster 105 of network security platforms 110A-D included in the data center 100.

The platform selector 410 of the illustrated example is to determine a platform selection value based on a first parameter value (e.g., the Client Random value) in a first message (e.g., the Client Hello message) from a client (e.g., the client 135) and a second parameter value (e.g., the Server Random value) in a second message (e.g., the Server Hello message) from the server 140. For example, the first and second messages may be associated with establishment of an encrypted network traffic flow (e.g., the flow 205) between the client and the server 140. In some examples, the platform selector hashes the first parameter value (e.g., the Client Random value) and the second parameter value (e.g., the Server Random value) to determine a hash value (such as a hash of the concatenation of the first parameter value and the second parameter value), and then processes the hash value with a modulo operation based on a number of network security platforms 110A-D included in the cluster 105 to determine the platform selection value (see Equation 1 above).

The example key sharer 415 of the illustrated example is to send a cryptographic session key(s) associated with an encrypted network traffic flow (e.g., the flow 205) to a selected one of the cluster 105 of network security platforms 110A-D (e.g., the network security platform 110C) based on the platform selection value determined by the platform selector 410. In some examples, the key sharer 415 is to send the cryptographic session key(s) associated with an encrypted network traffic flow (e.g., the flow 205) in a message. In some such examples, the message also includes the first parameter value and the second parameter value described above to identify the cryptographic session key(s) as being associated with the given flow (e.g., the flow 205).

Further operation details of the example platform selector 410 and the example key sharer 415 included in the example server 140 of the FIG. 4 are described in the context of the example message sequence diagram 500 of FIG. 5.

An example message sequence diagram 500 illustrating example operations performed by the network security platforms 110A and 110C, and by the server 140, to implement cluster-based cryptographic key sharing to support monitoring of the TLS flow 205 between the client 135 and the server 140 is illustrated in FIG. 5. In the illustrated example of FIG. 5, the network security platforms 110A and 110C are implemented by respective instances of the network security platform 110 of FIG. 3. In the illustrated example of FIG. 5, the server 140 is implemented based the example implementation of FIG. 4.

The message sequence diagram 500 of the illustrated example begins with the client 135 sending a Client Hello message containing the Client Random value (CR in FIG. 5) to establish the TLS flow 205 (corresponding to operation 504). In the illustrated example, the load balancer 130 assigns the network security platform 110A to monitor the TLS flow 205 (e.g., based on the 5-tuple determined from the Client Hello message) and, thus, the network security platform 110A is referred to as the target network security platform 110A in FIG. 5. Next, the platform selector 310 of the network security platform 110A copies the Client Random value from the Client Hello message (corresponding to operation 508) and the network security platform 110A forwards the Client Hello message to the server 140 (corresponding to operation 512). In response, the server 140 sends a Server Hello message containing the Server Random value (SR in FIG. 5) to the client 135 (corresponding to operation 516). The platform selector 310 of the network security platform 110A copies the Server Random value from the Server Hello message (corresponding to operation 520), and the network security platform 110A forwards the Server Hello message to the client 135 (corresponding to operation 522).

The platform selector 310 of the network security platform 110A also uses the stored Client Random value and the Server Random value associated with the TLS flow 205 to determine the platform selection value, as described above (corresponding to operation 524). If the resulting platform selection value identifies the network security platform 110A itself (e.g., based on stored configuration information, as described above), the key retriever 315 of the network security platform 110A retrieves the cryptographic session key(s) for the TLS flow 205 from the local key database 325 of the network security platform 110A (e.g., once the server 140 provides the keys after performing the same platform selection procedure) (corresponding to operation 528). However, if the resulting platform selection value identifies the network security platform 110C (e.g., referred to as the remote network security platform 110C in FIG. 5), the key retriever 315 of the network security platform 110A sends a query containing the Client Random value and the Server Random value to the remote network security platform 110C to request the cryptographic session key(s) for the TLS flow 205 (corresponding to operation 532). The key provider 320 of the remote network security platform 110C buffers the query until it receives the requested cryptographic session key(s) from the server 140 (corresponding to operation 536).

Meanwhile, the server 140 sends a server certificate to provide its public key for use in encrypting another random value to be sent to the server 140 to permit computation of the cryptographic session key(s) for the TLS flow 205, and also sends a Server Hello Done message to the client 135 (corresponding to operation 540). In response, the client 135 sends a Client Key Exchange message to provide the additional random value for generating cryptographic session key(s) (which is encrypted with the server's public key), sends a Change Cipher Spec message to transition from unencrypted to encrypted traffic, and sends a Finished message to the server 140, which is the first encrypted traffic from the client 135 (corresponding to operation 544). In response, the server 140 also sends a Change Cipher Spec message to the client 135 (corresponding to operation 548). The platform selector 410 of the server 140 also uses the stored Client Random value and the Server Random value associated with the TLS flow 205 to determine the platform selection value, as described above, and the key sharer 415 of the server 140 sends the cryptographic session key(s) generated for the TLS flow 205 to the identified network security platform, which is the network security platform 110C in the illustrated example (corresponding to operation 552).

In the illustrated example, the key sharer 415 of the server 140 sends the cryptographic session key(s) (at operation 552) in a Send Shared Key message that includes the cryptographic session key(s) and the corresponding Client Random value and the Server Random value to identify the cryptographic session key(s). In response, the key provider 320 of the network security platform 110C causes the cryptographic session key(s) to be buffered in the key database 325 of the network security platform 110C, and then accesses and responds to the buffered query from the network security platform 110A (see operation 536) with a Send Shared Key message including the requested cryptographic session key(s) for the TLS flow 205 and the corresponding Client Random value and the Server Random value to identify the cryptographic session key(s) (corresponding to operation 556). The key retriever 315 of the network security platform 110A then causes the received cryptographic session key(s) for the TLS flow 205 and the corresponding Client Random value and Server Random value to be buffered in the key database 325 of the network security platform 110A (corresponding to operation 560). In the illustrated example, the key provider 320 of the network security platform 110C also clears the cryptographic session key(s) for the TLS flow 205 from the key database 325 of the network security platform 110C (corresponding to operation 568).

In the illustrated example, the traffic analyzer 330 of the network security platform 110A buffers the Change Cipher Spec message sent at operation 548 and prevents it from being sent to the client 135 until the network security platform 110A receives and stores the cryptographic session key(s) for the TLS flow 205 (see operations 556 and 560). Once the cryptographic session key(s) for the TLS flow 205 are obtained at the network security platform 110A, the traffic analyzer 330 of the network security platform 110A releases the Change Cipher Spec message and passes it to the client 135. However, if a timeout period elapses without the network security platform 110A obtaining the cryptographic session key(s) for the TLS flow 205, the traffic analyzer 330 generates an error message and discards the Change Cipher Spec message, thereby preventing establishment of the TLS flow 205. Such a synchronization procedure ensures that a TLS flow (e.g., the TLS flow 205) is not established unless the target network security platform (e.g., the network security platform 110A in the illustrated example) has the requisite cryptographic session key(s) to monitor the TLS flow.

In some examples, the traffic analyzer 330 of the network security platform 110A also stores a copy of the Finished message sent by the client 135 at operation 544, although the traffic analyzer 330 allows this message to proceed to the server 140 unimpeded. Then, once the cryptographic session key(s) for the TLS flow 205 are obtained at the network security platform 110A (see operations 556 and 560), the traffic analyzer 330 of the network security platform 110A decrypts and validates the Finished message of operation 544. If validation of the Finished message fails, the traffic analyzer 330 generates an error message and terminates the flow 205. Such a procedure enables a target network security platform (e.g., the network security platform 110A in the illustrated example) to terminate a monitored TLS flow (e.g., the flow 205) early before further potentially malicious traffic reaches the server (e.g., the server 140).

Continuing with the example message sequence diagram 500, after sending the Change Cipher Spec message at operation 548, the server 140 sends a Finished message to complete establishment of the TLS flow 205 (corresponding to operation 568). In response, the client 135 begins sending encrypted traffic (corresponding to operation 572). In the illustrated example, the traffic analyzer 330 of the network security platform 110A intercepts the encrypted traffic, accesses the cryptographic session key(s) for the corresponding TLS flow 205 from the key database 325 of the network security platform 110A (corresponding to operation 576), decrypts the encrypted traffic using the cryptographic session key(s) (corresponding to operation 580) and inspects the unencrypted traffic (corresponding to operation 584). If the unencrypted traffic passes inspection, the traffic analyzer 330 of the network security platform 110A passes the encrypted traffic to the server 140 (corresponding to operation 588).

While an example manner of implementing the cluster 105 of network security platforms 110, 110A-D and the servers 115 of the data center 100 are illustrated in FIGS. 1-5, one or more of the elements, processes and/or devices illustrated in FIGS. 1-5 may be combined, divided, rearranged, omitted, eliminated and/or implemented in any other way. Further, the example network security platforms 100, 110A-D, the example servers 115, 140, the example load balancer 130, the example network interface 305, the example platform selector 310, the example key retriever 315, the example key provider 320, the example key database 325, the example traffic analyzer 330, the example network interface 405, the example platform selector 410 and/or the example key sharer 415 may be implemented by hardware, software, firmware and/or any combination of hardware, software and/or firmware. Thus, for example, any of the example network security platforms 100, 110A-D, the example servers 115, 140, the example load balancer 130, the example network interface 305, the example platform selector 310, the example key retriever 315, the example key provider 320, the example key database 325, the example traffic analyzer 330, the example network interface 405, the example platform selector 410 and/or the example key sharer 415 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example network security platforms 100, 110A-D, the example servers 115, 140, the example load balancer 130, the example network interface 305, the example platform selector 310, the example key retriever 315, the example key provider 320, the example key database 325, the example traffic analyzer 330, the example network interface 405, the example platform selector 410 and/or the example key sharer 415 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cluster 105 of network security platforms 110, 110A-D and the servers 115 may include one or more elements, processes and/or devices in addition to, or instead of, those illustrated in FIGS. 1-5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
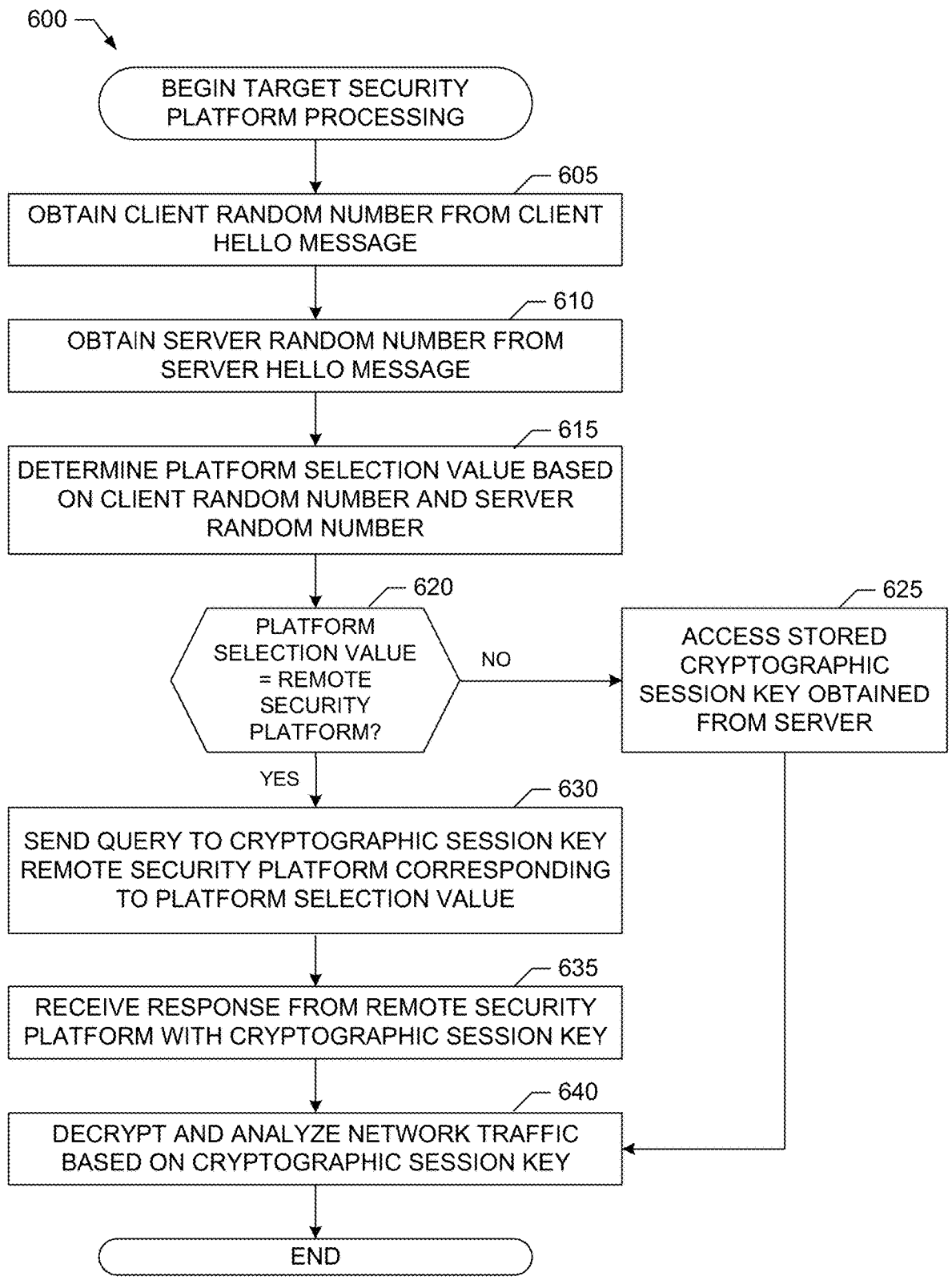
FIG. 6-7 are flowcharts representative of example computer readable instructions that may be executed to implement the example network security platform of FIG. 3.
Figure 7:
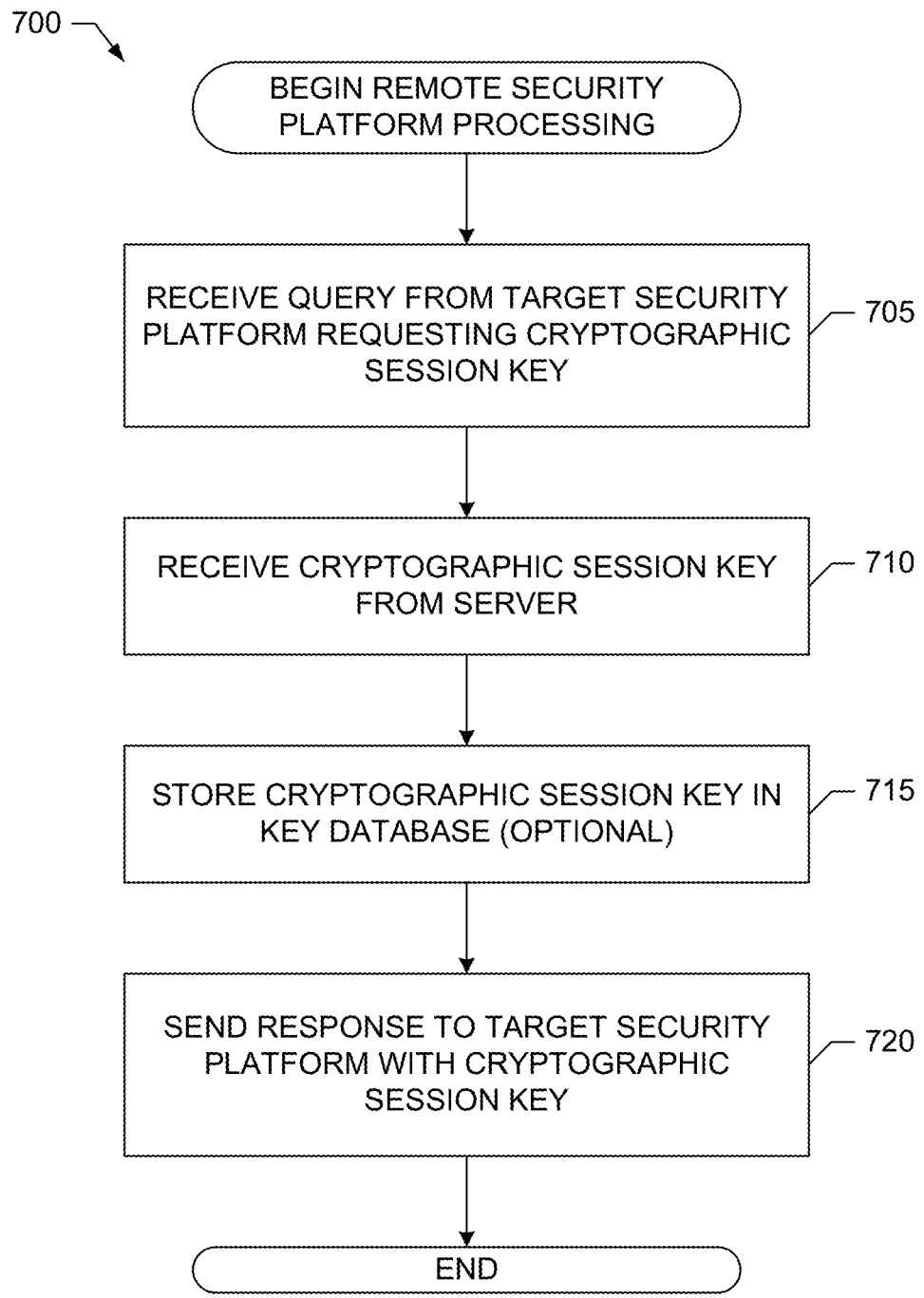
Figure 8:
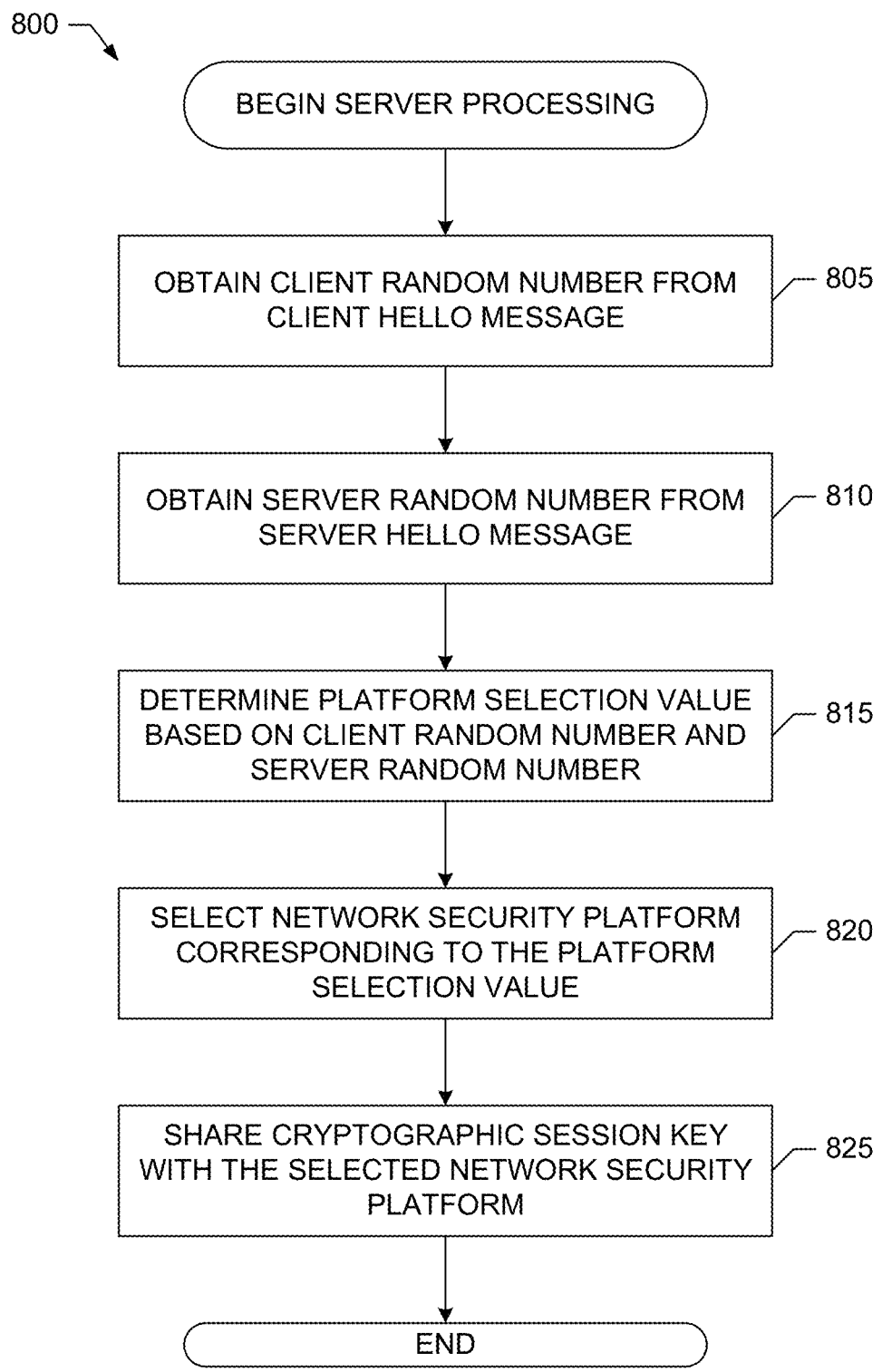
FIG. 8 is a flowchart representative of example computer readable instructions that may be executed to implement the example server of FIG. 4.

Flowcharts representative of example hardware logic, machine readable instructions, hardware implemented state machines, and/or any combination thereof for implementing the example network security platform 110 of FIG. 3 and the example server 140 of FIG. 4 are shown in FIGS. 6-8. In these examples, the machine readable instructions may be one or more executable programs or portion(s) thereof for execution by a computer processor, such as the processors 912 and/or 1012 shown in the example processor platform 900 and/or 1000 discussed below in connection with FIGS. 9-10. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 912 and/or 1012, but the entire program or programs and/or parts thereof could alternatively be executed by a device other than the processor 912 and/or 1012, and/or embodied in firmware or dedicated hardware. Further, although the example program(s) is(are) described with reference to the flowcharts illustrated in FIGS. 6-8, many other methods of implementing the example network security platform 110 of FIG. 3 and the example server 140 of FIG. 4 may alternatively be used. For example, with reference to the flowcharts illustrated in FIGS. 6-8, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

A first example program 600 that may be executed to implement the example network security platform 110 of FIG. 3 is illustrated in FIG. 6. For convenience and without loss of generality, execution of the program 600 is described from the perspective of the network security platform 110 of FIG. 3 being used to implement the network security platform 110A of FIGS. 1, 2 and 5. With reference to the preceding figures and associated written descriptions, the example program 600 of FIG. 6 begins execution at block 605 at which the platform selector 310 of the network security platform 110 obtains, as described above, a Client Random value from a Client Hello message sent by a client, such as the client 135, to a server, such as the server 140, to establish as TLS flow, such as the TLS flow 205. At block 610, the platform selector 310 of the network security platform 110 obtains, as described above, a Server Random value from a Server Hello message sent by the server 140 in response to the Client Hello message from the client 135. At block 615, the platform selector 310 of the network security platform 110 uses the obtained Client Random value and the obtained Server Random value associated with the TLS flow 205 to determine a platform selection value, as described above. If the platform selection value corresponds to the network security platform 110 itself (corresponding to the "No" branch of block 620), the key retriever 315 of the network security platform 110 retrieves the cryptographic session key(s) for the TLS flow 205 from the local key database 325 of the network security platform 110, as described above.

However, if the platform selection value corresponds to a remote network security platform (corresponding to the "Yes" branch of block 620), the key retriever 315 of the network security platform 110 sends a query to the remote network security platform identified (e.g., indexed) by the platform selection value to request the cryptographic session key(s) for the TLS flow 205, as described above. At block 635, the key retriever 315 of the network security platform 110 receives a response from the remote network security platform with the requested cryptographic session key(s) for the TLS flow 205 and causes the cryptographic session key(s) to be stored in the key database 325 of the network security platform 110, as described above. At block 640, the traffic analyzer 330 of the network security platform 110 decrypts and analyzes, as described above, the encrypted network traffic corresponding to the TLS flow 205 using the cryptographic session key(s) obtained at block 635.

A second example program 700 that may be executed to implement the example network security platform 110 of FIG. 3 is illustrated in FIG. 7. For convenience and without loss of generality, execution of the program 700 is described from the perspective of the network security platform 110 of FIG. 3 being used to implement the network security platform 110C of FIGS. 1, 2 and 5. With reference to the preceding figures and associated written descriptions, the example program 700 of FIG. 7 begins execution at block 705 at which key provider 320 of the network security platform 110 receives and buffers a query from a target network security platform (e.g., the network security platform 110A in the examples provided above) requesting the cryptographic session key(s) associated with a TLS flow, such as the TLS flow 205, to be monitored, as described above. At block 710, the key provider 320 of the network security platform 110 receives, as described above, the cryptographic session key(s) associated with a TLS flow 205 from a server, such as the server 140. At block 715, the key provider 320 of the network security platform 110 causes the received cryptographic session key(s) associated with a TLS flow 205 to be stored in the key database 325 of the network security platform 110, as described above. At block 720, the key provider 320 of the network security platform 110 sends a response to the target network security platform with the cryptographic session key(s) requested in the previous query, as described above. In some examples, the processing associated with block 715 is optional and/or not performed. In some such examples, after the network security platform 110 receives the cryptographic session key(s) associated with a TLS flow from a server at block 710, processing proceeds to block 720 at which the key provider 320 of the network security platform 110 sends the cryptographic session key(s) to the target network security platform without storing the cryptographic session key(s) locally.

An example program 800 that may be executed to implement the example server 140 of FIG. 4 is illustrated in FIG. 8. With reference to the preceding figures and associated written descriptions, the example program 800 of FIG. 8 begins execution at block 805 at which the platform selector 410 of the server 140 obtains, as described above, a Client Random value from a Client Hello message sent by a client, such as the client 135, to the server 140 to establish as TLS flow, such as the TLS flow 205. At block 810, the platform selector 410 of the server 140 obtains, as described above, a Server Random value from a Server Hello message sent by the server 140 in response to the Client Hello message from the client 135. At block 815, the platform selector 410 of the server 140 uses the obtained Client Random value and the obtained Server Random value associated with the TLS flow 205 to determine a platform selection value, as described above. At block 820, the platform selector 410 of the server 140 selects, as described above, the network security platform 110A-D of the cluster 105 that is identified (e.g., based on configuration information) by the platform selection value determined at block 815. At block 825, the key sharer 415 of the server 140 sends the cryptographic session key(s) associated with the TLS flow 205 to the selected network security platform, as described above.

Figure 9:
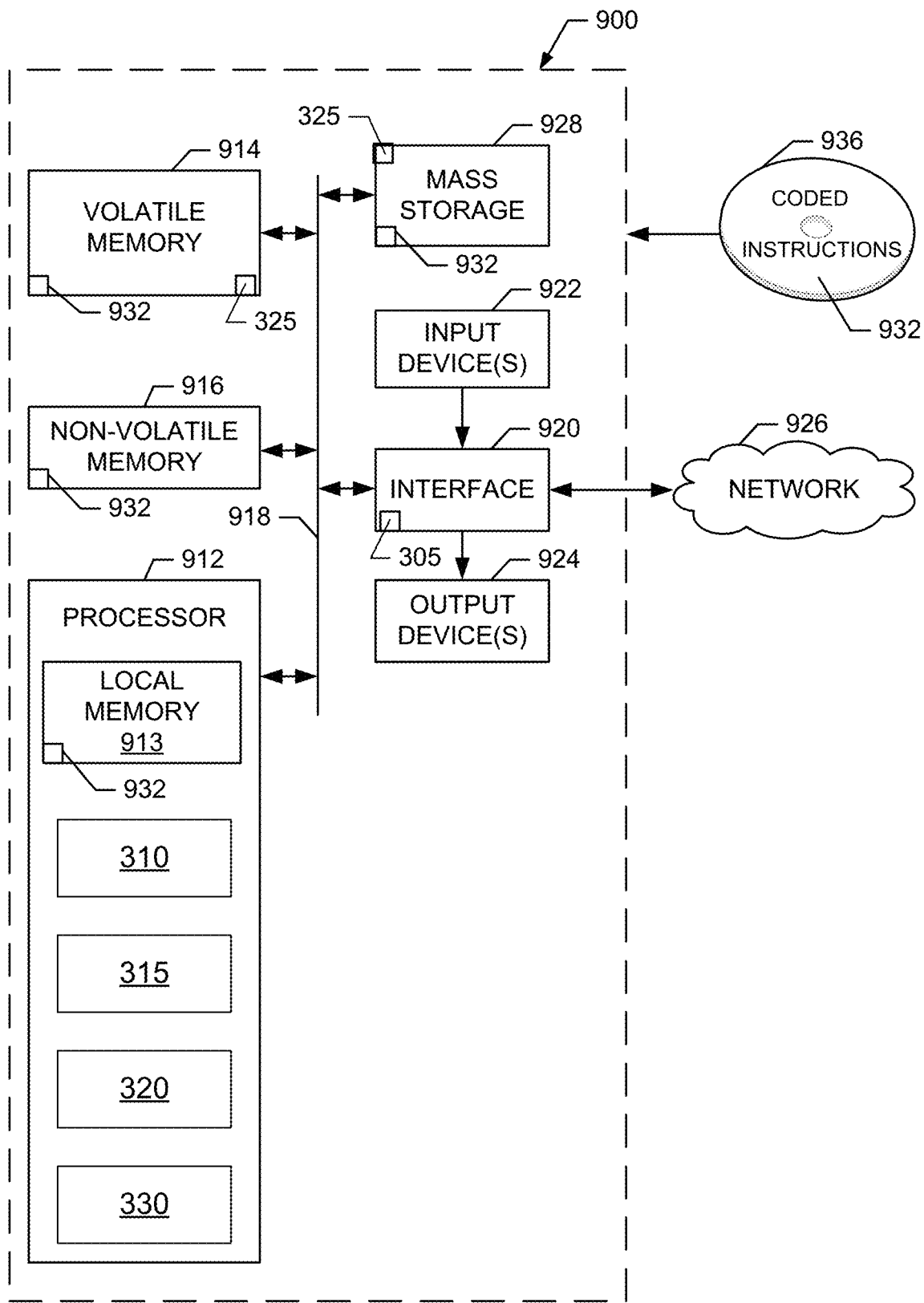
FIG. 9 is a block diagram of an example processor platform structured to execute the example computer readable instructions of FIGS. 6 and/or 7 to implement the example network security platform of FIG. 3.

FIG. 9 is a block diagram of an example processor platform 900 structured to execute the instructions of FIGS. 6 and/or 7 to implement the example network security platform 110 of FIG. 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor 912 may be a semiconductor based (e.g., silicon based) device. In this example, the processor 912 implements the example platform selector 310, the example key retriever 315, the example key provider 320 and the example traffic analyzer 330.

The processor 912 of the illustrated example includes a local memory 913 (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. In some examples, the network 926 corresponds to the example network 125 of FIG. 1. The communication can be via, for example, an Ethernet connection, a digital subscriber line (DSL) connection, a telephone line connection, a coaxial cable system, a satellite system, a line-of-site wireless system, a cellular telephone system, etc. The interface circuit 920 also implements the example network interface 305.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives. In some examples, the mass storage device 928 implement the example key database 325. Additionally or alternatively, in some examples the volatile memory 914 implements the key database 325.

The machine executable instructions 932 corresponding to the instructions of FIGS. 6 and/or 7 may be stored in the mass storage device 928, in the volatile memory 914, in the non-volatile memory 916, in the local memory 913 and/or on a removable non-transitory computer readable storage medium, such as a CD or DVD 936.

Figure 10:
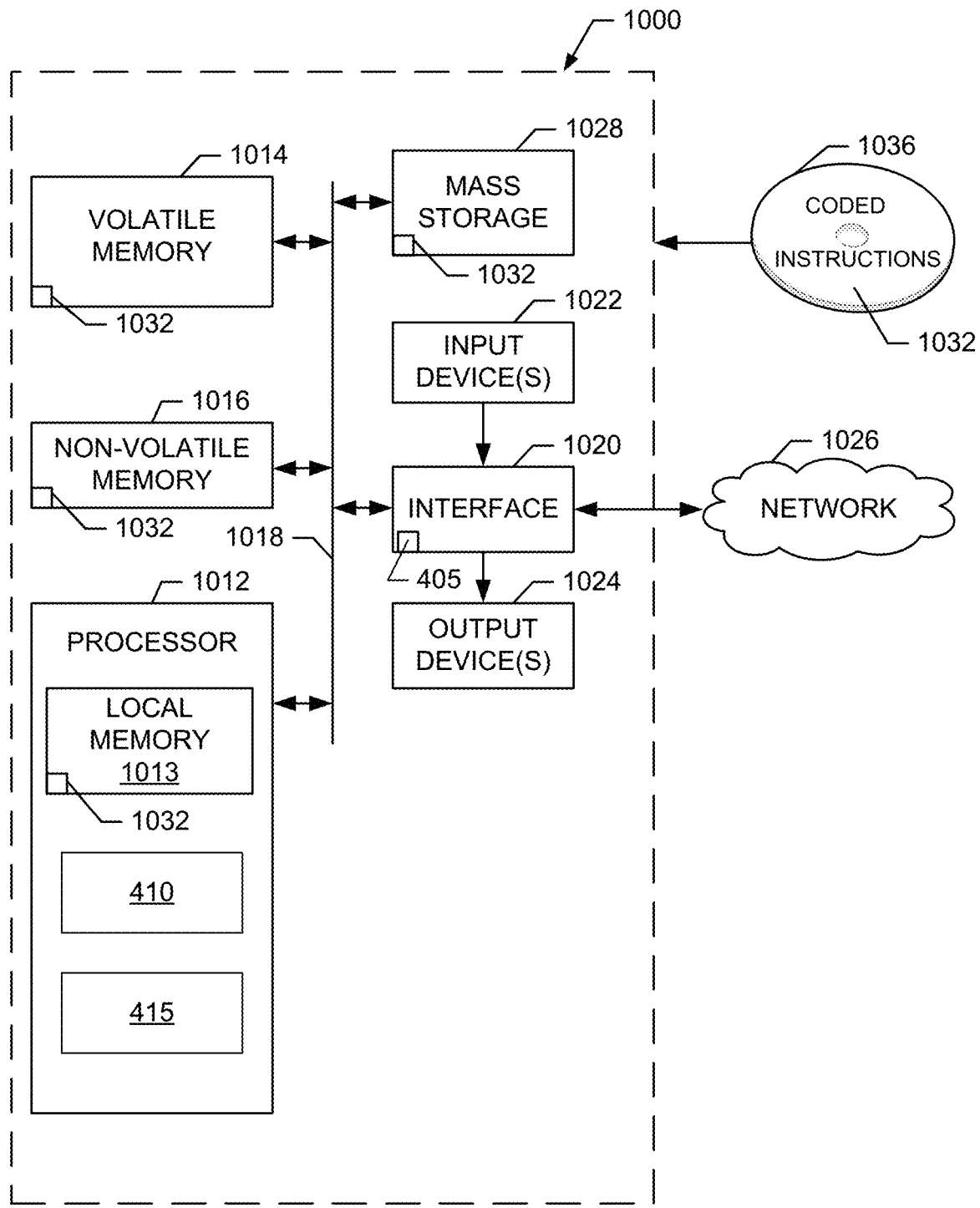
FIG. 10 is a block diagram of an example processor platform structured to execute the example computer readable instructions of FIG. 8 to implement the example server of FIG. 4.

FIG. 10 is a block diagram of an example processor platform 1000 structured to execute the instructions of FIG. 8 to implement the example server 140 of FIG. 4. The processor platform 1000 can be, for example, a server, a personal computer, a workstation, a self-learning machine (e.g., a neural network), a mobile device (e.g., a cell phone, a smart phone, a tablet such as an iPad™), a PDA, an Internet appliance, or any other type of computing device.

The processor platform 1000 of the illustrated example includes a processor 1012. The processor 1012 of the illustrated example is hardware. For example, the processor 912 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example platform selector 410 and the example key sharer 415.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by SDRAM, DRAM, RDRAM® and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a USB, a Bluetooth® interface, an NFC interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., an LED, an OLED, an LCD, a CRT display, an IPS display, a touchscreen, etc.), a tactile output device, a printer and/or speakers(s). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. In some examples, the network 1026 corresponds to the example network 125 of FIG. 1. The communication can be via, for example, an Ethernet connection, a digital subscriber line (DSL) connection, a telephone line connection, a coaxial cable system, a satellite system, a line-of-site wireless system, a cellular telephone system, etc. The interface circuit 1020 also implements the example network interface 505.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and DVD drives.

The machine executable instructions 1032 corresponding to the instructions of FIG. 8 may be stored in the mass storage device 1028, in the volatile memory 1014, in the non-volatile memory 1016, in the local memory 1013 and/or on a removable non-transitory computer readable storage medium, such as a CD or DVD 1036.

Figure 11:
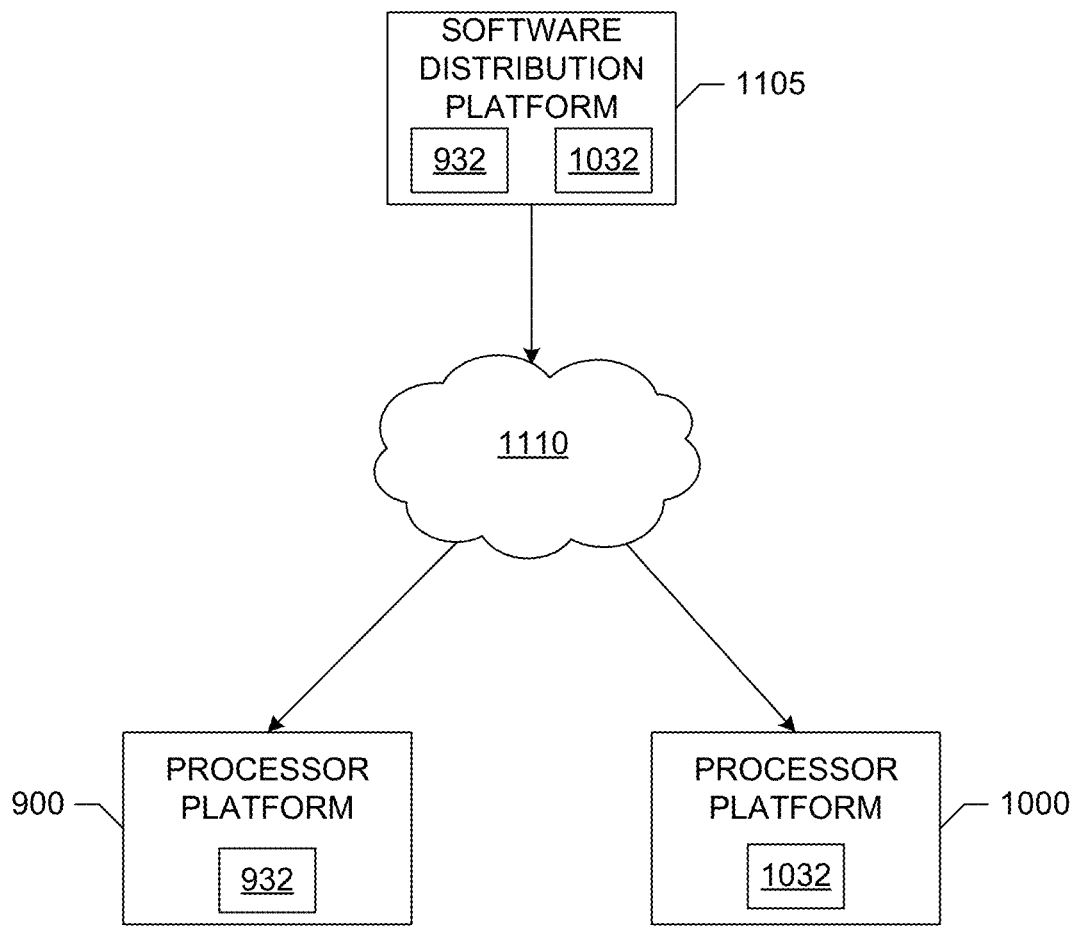
FIG. 11 is a block diagram of an example software distribution platform to distribute software corresponding to the example computer readable instructions of FIGS. 6, 7 and/or 8 to the example processor platforms of FIGS. 9 and/or 10 to implement the example network security platform of FIG. 3 and/or the example server of FIG. 4.

A block diagram illustrating an example software distribution platform 1105 to distribute software corresponding to the example computer readable instructions 932 and/or 1032 to the example processor platforms 900 and/or 1000 of FIGS. 9 and/or 10 to implement the example network security platform 110 of FIG. 3 and/or the example server 140 of FIG. 4 is illustrated in FIG. 11. In the illustrated example, the software distribution platform 1105 is to store the computer readable instructions 932, which may correspond to the example computer readable instructions 600 and/or 700 of FIGS. 6 and/or 7, respectively, as described above. The software distribution platform 1105 of the illustrated example also is to store the computer readable instructions 1032, which may correspond to the example computer readable instructions 800 of FIG. 8, as described above. The example software distribution platform 1105 is in communication with the example processor platforms 900 and/or 1000 via an example network 1110, which may correspond to any one or more of the example networks 125, 926 and/or 1026 described above. This enables the software distribution platform 1105 to download the computer readable instructions 932, which may correspond to the example computer readable instructions 600 and/or 700 of FIGS. 6 and/or 7, respectively, to the example processor platform 900, which is to execute the computer readable instructions 932 to implement the network security platform 110. Additionally or alternatively, the software distribution platform 1105 to download the computer readable instructions 1023, which may correspond to the example computer readable instructions 800 of FIG. 8, to the example processor platform 1000, which is to execute the computer readable instructions 1032 to implement the server 140. As such, the example processor platform 900 may be implemented by any computer server, data facility, cloud service, etc., capable of storing and downloading software to other computing devices.

The foregoing disclosure provides example methods, apparatus and articles of manufacture that implement sharing of cryptographic session keys among a cluster of network security platforms. The following further examples are disclosed herein. The disclosed examples can be implemented individually and/or in one or more combinations.

Example 1 is a non-transitory computer readable medium including computer readable instructions which, when executed, cause at least one processor implementing a first network security platform to at least: (1) determine a platform selection value based on a first parameter value in a first message from a client and a second parameter value in a second message from a server, the first and second messages associated with establishment of an encrypted network traffic flow between the client and the server; (2) obtain a cryptographic session key associated with the encrypted network traffic flow from a selected one of a cluster of network security platforms based on the platform selection value, the first network security platform included in the cluster of network security platforms; and (3) analyze network traffic associated with the encrypted network traffic flow based on the cryptographic session key.

Example 2 includes the subject matter of example 1, wherein the first message is a first hello message sent by the client to establish the encrypted network traffic flow between the client and the server, the first parameter value is a first random number included in the first hello message, the second message is a second hello message sent by the server in response to the first hello message, and the second parameter value is a second random number included in the second hello message.

Example 3 includes the subject matter of example 2, wherein to determine the platform selection value, the computer readable instructions, when executed, cause the at least one processor to: (1) hash the first random number and the second random number to determine a hash value; and (2) process the hash value with a modulo operation based on a number of network security platforms included in the cluster to determine the platform selection value.

Example 4 includes the subject matter of any one of examples 1 to 3, wherein to obtain the cryptographic session key, the computer readable instructions, when executed, cause the at least one processor to: (1) determine whether the platform selection value identifies the first network security platform as the selected one of the cluster of network security platforms; and (2) when the first network security platform is not identified by the platform selection value as the selected one of the cluster of network security platforms: (a) send a query to the selected one of the cluster of network security platforms identified by the platform selection value; and (b) access a response from the selected one of the cluster of network security platforms, the response including the cryptographic session key.

Example 5 includes the subject matter of example 4, wherein the query includes the first parameter value and the second parameter value.

Example 6 includes the subject matter of example 4 or example 5, wherein the computer readable instructions, when executed, further cause the at least one processor to: (1) buffer a third message from the server to the client until at least the response including the cryptographic session key is received from the selected one of the cluster of network security platforms; (2) pass the third message to the client in response to receipt of the response including the cryptographic session key; and (3) generate an error message in response to an elapse of a timeout period without receipt of the response including the cryptographic session key from the selected one of the cluster of network security platforms.

Example 7 includes the subject matter of example 6, wherein the computer readable instructions, when executed, further cause the at least one processor to: (1) buffer a fourth message from the client to the server until at least the response including the cryptographic session key is received from the selected one of the cluster of network security platforms, the fourth message received at the first network security platform before the third message from the server to the client; and (2) generate the error message in response to unsuccessful validation of the fourth message based on the cryptographic session key.

Example 8 is a first network security platform including platform selector to determine a platform selection value based on a first parameter value in a first message from a client and a second parameter value in a second message from a server, the first and second messages associated with establishment of an encrypted network traffic flow between the client and the server. The first network security platform of example 7 also includes a key retriever to obtain a cryptographic session key associated with the encrypted network traffic flow from a selected one of a cluster of network security platforms based on the platform selection value, the first network security platform included in the cluster of network security platforms. The first network security platform of example 7 further includes a traffic analyzer to analyze network traffic associated with the encrypted network traffic flow based on the cryptographic session key.

Example 9 includes the subject matter of example 8, wherein the first message is a first hello message sent by the client to establish the encrypted network traffic flow between the client and the server, the first parameter value is a first random number included in the first hello message, the second message is a second hello message sent by the server in response to the first hello message, and the second parameter value is a second random number included in the second hello message.

Example 10 includes the subject matter of example 9, wherein the platform selector is to: (1) hash the first random number and the second random number to determine a hash value; and (2) process the hash value with a modulo operation based on a number of network security platforms included in the cluster to determine the platform selection value.

Example 11 includes the subject matter of any one of examples 8 to 10, wherein the key retriever is to: (1) determine whether the platform selection value identifies the first network security platform as the selected one of the cluster of network security platforms; and (2) when the first network security platform is not identified by the platform selection value as the selected one of the cluster of network security platforms: (A) send a query to the selected one of the cluster of network security platforms identified by the platform selection value; and (B) access a response from the selected one of the cluster of network security platforms, the response including the cryptographic session key.

Example 12 includes the subject matter of example 11, wherein the query includes the first parameter value and the second parameter value.

Example 13 includes the subject matter of example 11 or example 12, wherein the traffic analyzer is to: (1) buffer a third message from the server to the client until at least the response including the cryptographic session key is received from the selected one of the cluster of network security platforms; (2) pass the third message to the client in response to receipt of the response including the cryptographic session key; and (3) generate an error message in response to an elapse of a timeout period without receipt of the response including the cryptographic session key from the selected one of the cluster of network security platforms.

Example 14 includes the subject matter of example 13, wherein the traffic analyzer is to: (1) buffer a fourth message from the client to the server until at least the response including the cryptographic session key is received from the selected one of the cluster of network security platforms, the fourth message received at the first network security platform before the third message from the server to the client; and (2) generate the error message in response to unsuccessful validation of the fourth message based on the cryptographic session key.

Example 15 is a method including determining, by executing an instruction with at least one processor implementing a first network security platform, a platform selection value based on a first parameter value in a first message from a client and a second parameter value in a second message from a server, the first and second messages associated with establishment of an encrypted network traffic flow between the client and the server. The method of example 15 also includes obtaining a cryptographic session key associated with the encrypted network traffic flow from a selected one of a cluster of network security platforms based on the platform selection value, the first network security platform included in the cluster of network security platforms. The method of example 15 further includes analyzing, by executing an instruction with the at least one processor, network traffic associated with the encrypted network traffic flow based on the cryptographic session key.

Example 16 includes the subject matter of example 15, wherein the first message is a first hello message sent by the client to establish the encrypted network traffic flow between the client and the server, the first parameter value is a first random number included in the first hello message, the second message is a second hello message sent by the server in response to the first hello message, and the second parameter value is a second random number included in the second hello message.

Example 17 includes the subject matter of example 16, wherein the determining of the platform selection value includes: (1) hashing the first random number and the second random number to determine a hash value; and (2) processing the hash value with a modulo operation based on a number of network security platforms included in the cluster to determine the platform selection value.

Example 18 includes the subject matter of any one of examples 15 to 17, wherein the obtaining of the cryptographic session key includes: (1) determining whether the platform selection value identifies the first network security platform as the selected one of the cluster of network security platforms; and (2) when the first network security platform is not identified by the platform selection value as the selected one of the cluster of network security platforms: (A) sending a query to the selected one of the cluster of network security platforms identified by the platform selection value; and (B) accessing a response from the selected one of the cluster of network security platforms, the response including the cryptographic session key.

Example 19 includes the subject matter of example 18, wherein the query includes the first parameter value and the second parameter value.

Example 20 includes the subject matter of example 18 or example 19, and further includes: (1) buffering a third message from the server to the client until at least the response including the cryptographic session key is received from the selected one of the cluster of network security platforms; (2) passing the third message to the client in response to receiving the response including the cryptographic session key; and (3) generating an error message in response to an elapse of a timeout period without receipt of the response including the cryptographic session key from the selected one of the cluster of network security platforms.

Example 21 includes the subject matter of example 20, and further includes: (1) buffering a fourth message from the client to the server until at least the response including the cryptographic session key is received from the selected one of the cluster of network security platforms, the fourth message received at the first network security platform before the third message from the server to the client; and (2) generating the error message in response to unsuccessful validation of the fourth message based on the cryptographic session key.

Example 22 is a non-transitory computer readable medium including computer readable instructions which, when executed, cause at least one processor of a server to at least: (1) determine a platform selection value based on a first parameter value in a first message from a client and a second parameter value in a second message to be sent by the server, the first and second messages associated with establishment of an encrypted network traffic flow between the client and the server; and (2) send a cryptographic session key associated with the encrypted network traffic flow to a selected one of a cluster of network security platforms based on the platform selection value.

Example 23 includes the subject matter of example 22, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 24 includes the subject matter of example 23, wherein to determine the platform selection value, the computer readable instructions, when executed, cause the at least one processor to: (1) hash the first random number and the second random number to determine a hash value; and (2) process the hash value with a modulo operation based on a number of network security platforms included in the cluster to determine the platform selection value.

Example 25 includes the subject matter of any one of examples 22 to 24, wherein to send the cryptographic session key, the computer readable instructions, when executed, cause the at least one processor to send a third message to the selected one of a cluster of network security platforms, the third message including the cryptographic session key, the first parameter value and the second parameter value.

Example 26 is a server including a platform selector to determine a platform selection value based on a first parameter value in a first message from a client and a second parameter value in a second message to be sent by the server, the first and second messages associated with establishment of an encrypted network traffic flow between the client and the server. The server of example 26 also includes a key sharer to send a cryptographic session key associated with the encrypted network traffic flow to a selected one of a cluster of network security platforms based on the platform selection value.

Example 27 includes the subject matter of example 26, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 28 includes the subject matter of example 27, wherein the platform selector is to: (1) hash the first random number and the second random number to determine a hash value; and (2) process the hash value with a modulo operation based on a number of network security platforms included in the cluster to determine the platform selection value.

Example 29 includes the subject matter of any one of examples 26 to 28, wherein to send the cryptographic session key, the key sharer is to send a third message to the selected one of a cluster of network security platforms, the third message including the cryptographic session key, the first parameter value and the second parameter value.

Example 30 is a method including determining, by executing an instruction with at least one processor of a server, a platform selection value based on a first parameter value in a first message from a client and a second parameter value in a second message to be sent by the server, the first and second messages associated with establishment of an encrypted network traffic flow between the client and the server. The method of example 30 also includes sending a cryptographic session key associated with the encrypted network traffic flow to a selected one of a cluster of network security platforms based on the platform selection value.

Example 31 includes the subject matter of example 30, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 32 includes the subject matter of example 31, wherein the determining of the platform selection value includes: (1) hashing the first random number and the second random number to determine a hash value; and (2) processing the hash value with a modulo operation based on a number of network security platforms included in the cluster to determine the platform selection value.

Example 33 includes the subject matter of any one of examples 30 to 32, wherein the sending of the cryptographic session key includes sending a third message to the selected one of a cluster of network security platforms, the third message including the cryptographic session key, the first parameter value and the second parameter value.

Example 34 is a non-transitory computer readable medium including computer readable instructions which, when executed, cause at least one processor implementing a first network security platform to at least: (1) store a cryptographic session key from a server, the cryptographic session key associated with an encrypted network traffic flow between the server and a client different from the first network security platform; (2) access a query from a second network security platform requesting the cryptographic session key; and (3) generate a response including the cryptographic session key to send to the second network security platform.

Example 35 includes the subject matter of example 34, wherein the computer readable instructions, when executed, cause the at least one processor to buffer the query from the second network security platform until receipt of the cryptographic session key from the server.

Example 36 includes the subject matter of example 35, wherein the computer readable instructions, when executed, cause the at least one processor to generate the response after receipt of the cryptographic session key from the server.

Example 37 includes the subject matter of any one of examples 34 to 36, wherein the computer readable instructions, when executed, cause the at least one processor to obtain the cryptographic session key from a message from the server, the message including the cryptographic session key, the message also including a first parameter value and a second parameter value to identify the cryptographic session key.

Example 38 includes the subject matter of example 37, wherein the message is a third message, the first parameter value is associated with a first message from the client, the second parameter value is associated with a second message from the server, and the first message and the second message are associated with establishment of the encrypted network traffic flow between the client and the server.

Example 39 includes the subject matter of example 38, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 40 includes the subject matter of any one of examples 37 to 39, wherein the query from the second network security platform includes the first parameter value and the second parameter value.

Example 41 is a first network security platform including a key database to store a cryptographic session key from a server, the cryptographic session key associated with an encrypted network traffic flow between the server and a client different from the first network security platform. The first network security platform of example 41 also includes a key provider to access a query from a second network security platform requesting the cryptographic session key, and generate a response including the cryptographic session key to send to the second network security platform.

Example 42 includes the subject matter of example 41, wherein the key provider is to buffer the query from the second network security platform until receipt of the cryptographic session key from the server.

Example 43 includes the subject matter of example 42, wherein the key provider is to generate the response after receipt of the cryptographic session key from the server.

Example 44 includes the subject matter of any one of examples 41 to 43, wherein the key database is to obtain the cryptographic session key from a message from the server, the message including the cryptographic session key, the message also including a first parameter value and a second parameter value to identify the cryptographic session key.

Example 45 includes the subject matter of example 44, wherein the message is a third message, the first parameter value is associated with a first message from the client, the second parameter value is associated with a second message from the server, and the first message and the second message are associated with establishment of the encrypted network traffic flow between the client and the server.

Example 46 includes the subject matter of example 45, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 47 includes the subject matter of any one of examples 44 to 46, wherein the query from the second network security platform includes the first parameter value and the second parameter value.

Example 48 is a method including storing, by executing an instructions with at least one processor implementing a first network security platform, a cryptographic session key from a server, the cryptographic session key associated with an encrypted network traffic flow between the server and a client different from the first network security platform. The method of example 48 also includes accessing, by executing an instructions with the at least one processor, a query from a second network security platform requesting the cryptographic session key. The method of example 48 further includes generating, by executing an instructions with the at least one processor, a response including the cryptographic session key to send to the second network security platform.

Example 49 includes the subject matter of example 48, and further includes buffering the query from the second network security platform until receipt of the cryptographic session key from the server.

Example 50 includes the subject matter of example 49, and further includes generating the response after receipt of the cryptographic session key from the server.

Example 51 includes the subject matter of any one of examples 48 to 50, and further includes obtaining the cryptographic session key from a message from the server, the message including the cryptographic session key, the message also including a first parameter value and a second parameter value to identify the cryptographic session key.

Example 52 includes the subject matter of example 51, wherein the message is a third message, the first parameter value is associated with a first message from the client, the second parameter value is associated with a second message from the server, and the first message and the second message are associated with establishment of the encrypted network traffic flow between the client and the server.

Example 53 includes the subject matter of example 52, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

Example 54 includes the subject matter of any one of examples 51 to 53, wherein the query from the second network security platform includes the first parameter value and the second parameter value.

From the foregoing, it will be appreciated that example methods, apparatus and articles of manufacture have been disclosed that implement sharing of cryptographic session keys among a cluster of network security platforms. The disclosed methods, apparatus and articles of manufacture improve the efficiency of using a computing device by employing a novel platform selection procedure that enables a server to limit sharing of the cryptographic session key(s) for a given flow with just one network security platform in the cluster, rather than all network security platforms in the cluster. The novel platform selection procedure also enables a target network security platform in the cluster, which is assigned by the load balancer to monitor the given network traffic flow, to identify the network security platform to which the server shared the cryptographic session key(s), and obtain the cryptographic session key(s) from that network security platform. In this way, cluster-based cryptographic key sharing, as disclosed herein, can scale to network security platform clusters of any size, with a server still being able to limit sharing of the cryptographic session key(s) for a given network traffic flow with just one of the network security platforms in the cluster, and a target network security platform assigned to monitor the given network traffic flow being able to know with certainty the network security platform of the cluster from which the associated cryptographic session key(s) can be retrieved. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. At least one non-transitory computer readable medium comprising computer readable instructions which, when executed, cause at least one processor of a first network security platform to at least:
   buffer a query from a second network security platform for a cryptographic session key until at least receipt of the cryptographic session key from a server, the cryptographic session key associated with an encrypted network traffic flow between the server and a client, the server and the client to be different from the first network security platform and the second network security platform, the first network security platform to be identifiable as a recipient of the cryptographic session key from the server based on a platform selection value, the platform selection value based on a first parameter value associated with a first message from the client and a second parameter value associated with a second message from the server;
   store the cryptographic session key from the server; and
   after the receipt of the cryptographic session key from the server, generate a response including the cryptographic session key to send to the second network security platform.

2. The at least one non-transitory computer readable medium of claim 1, wherein the computer readable instructions cause the at least one processor to obtain the cryptographic session key from a third message from the server, the third message including the cryptographic session key, the third message also including the first parameter value and the second parameter value to identify the cryptographic session key.

3. The at least one non-transitory computer readable medium of claim 2, wherein the first message and the second message are associated with establishment of the encrypted network traffic flow between the client and the server.

4. The at least one non-transitory computer readable medium of claim 3, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

5. The at least one non-transitory computer readable medium of claim 2, wherein the query from the second network security platform includes the first parameter value and the second parameter value.

6. A first network security platform comprising:
   a key database to store a cryptographic session key from a server, the cryptographic session key associated with an encrypted network traffic flow between the server and a client, the server and the client to be different from the first network security platform;
   instructions in the first network security platform; and
   processor circuitry to execute the instructions to at least:
      buffer a query from a second network security platform requesting the cryptographic session key until at least receipt of the cryptographic session key from the server, the first network security platform to be identifiable as a recipient of the cryptographic session key from the server based on a platform selection value, the platform selection value based on a first parameter value associated with a first message from the client and a second parameter value associated with a second message from the server; and
      after the receipt of the cryptographic session key from the server, generate a response including the cryptographic session key to send to the second network security platform.

7. The first network security platform of claim 6, wherein the key database is to obtain the cryptographic session key from a third message from the server, the third message including the cryptographic session key, the third message also including the first parameter value and the second parameter value to identify the cryptographic session key.

8. The first network security platform of claim 7, wherein the first message and the second message are associated with establishment of the encrypted network traffic flow between the client and the server.

9. The first network security platform of claim 8, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

10. The first network security platform of claim 7, wherein the query from the second network security platform includes the first parameter value and the second parameter value.

11. A method comprising:
   buffering, at a first network security platform, a query from a second network security platform for a cryptographic session key until at least receipt of the cryptographic session key from a server, the cryptographic session key associated with an encrypted network traffic flow between the server and a client different from the first network security platform, the first network security platform to be identifiable as a recipient of the cryptographic session key from the server based on a platform selection value, the platform selection value based on a first parameter value associated with a first message from the client and a second parameter value associated with a second message from the server;

storing, by executing an instruction with at least one processor, the cryptographic session key from the server; and after receiving the cryptographic session key from the server, generating, by executing an instruction with at least one processor, a response including the cryptographic session key to send to the second network security platform.

12. The method of claim 11, further including obtaining the cryptographic session key from a third message from the server, the third message including the cryptographic session key, the third message also including the first parameter value and the second parameter value to identify the cryptographic session key.

13. The method of claim 12, wherein the first message and the second message are associated with establishment of the encrypted network traffic flow between the client and the server.

14. The method of claim 13, wherein the first message is a first hello message sent by the client to establish the encrypted network traffic flow between the client and the server, the first parameter value is a first random number included in the first hello message, the second message is a second hello message to be sent by the server in response to the first hello message, and the second parameter value is a second random number included in the second hello message.

* * * * *